United States Patent

Danieau

[11] Patent Number: 5,906,355
[45] Date of Patent: May 25, 1999

[54] AIRFLOW CONTROL DEVICE OF THE WOUND FILM TYPE, IN PARTICULAR FOR MOTOR VEHICLES

[75] Inventor: Jacques Danieau, Noisy Le Roi, France

[73] Assignee: Valeo Climatisation, La Verriere, France

[21] Appl. No.: 08/902,747

[22] Filed: Jul. 30, 1997

[30] Foreign Application Priority Data

Jul. 30, 1996 [FR] France .................................. 96.09590

[51] Int. Cl.$^6$ .......................................................... F16K 3/00
[52] U.S. Cl. ............................................ 251/326; 251/901
[58] Field of Search ................................... 251/901, 326

[56] References Cited

U.S. PATENT DOCUMENTS

| | | | |
|---|---|---|---|
| 3,773,077 | 11/1973 | Barnebey | 251/901 |
| 3,828,816 | 8/1974 | Barnebey | 251/901 |
| 4,867,202 | 9/1989 | Farmer | 251/901 |
| 5,105,730 | 4/1992 | Smith . | |
| 5,154,223 | 10/1992 | Ishimaru et al. | 251/901 |
| 5,160,115 | 11/1992 | Ito et al. | 251/901 |
| 5,243,830 | 9/1993 | Ito et al. | 251/901 |

FOREIGN PATENT DOCUMENTS 412 063 A1  2/1991  European Pat. Off. .
2 580 791  10/1986  France .

Primary Examiner—Denise L. Ferensic
Assistant Examiner—Joanne Y. Kim
Attorney, Agent, or Firm—Morgan & Finnegan, LLP

[57] ABSTRACT

A flow control device for controlling the flow of a stream of air through an air passage aperture, such as the open end of a duct in a heating and/or air conditioning apparatus of a motor vehicle, comprises a strip of film, the two ends of which are wound on two rollers spaced apart from each other. The film has an active region extending between the rollers and displaceable across the aperture by rotation of the rollers. The active region has open regions and closed regions for the selective control of the air stream. The device has a case defining two reserve spaces, each surrounding a respective roller, and serving as a magazine for receiving a slack loop of the film resulting from the differences between the overall diameters of the two rollers.

18 Claims, 2 Drawing Sheets

AIRFLOW CONTROL DEVICE OF THE WOUND FILM TYPE, IN PARTICULAR FOR MOTOR VEHICLES

FIELD OF THE INVENTION

This invention relates to an airflow control device of the type having a wound flow control film or strip, for controlling the flow of a stream of air through an air passage aperture, in particular in a heating and/or air conditioning installation of a motor vehicle.

BACKGROUND OF THE INVENTION

In an installation of the above type, it is necessary to provide at least one control device for controlling the flow of a stream of air through an air passage aperture. This air stream may, according to requirements, be cold air, heated air, or conditioned air. The air passage aperture may in particular be defined by a duct, a distribution vent, a channel, or other element of the installation.

From French patent publication No. FR 2 580 791A, it is known to make use of a control device of the type comprising a film which is wound on two rollers spaced apart from each other, the film being adapted to have an active or working position extending across the air passage aperture between the two rollers, this active portion being formed with open regions and solid or closed regions. The flow of the stream of air is selectively controlled according to the amount by which the film is wound on one roller relative to the other. Suitable driving means are provided for rotating the two rollers in synchronism with each other. The film is thus able to be displaced in one direction or the other by winding on to one of the two rollers, being simultaneously unwound from the other roller, thus offering various possibilities for control of the flow of the stream of air. Such a device is also referred to as a film obturator.

In a film obturator the film must be sufficiently thick, i.e. with a typical thickness of the order of a few tenths of a millimeter, in order to give enough mechanical strength to the film. In addition, due to the fact that the film must be put into various positions, each of which corresponds to a different setting in the control of the flow of the air stream, the strip of film must be sufficiently long, and its length may for example be anywhere in the range between 10 centimeters and 1 meter.

Thus, according to the relative position of the film on the rollers, there is likely to be, at any given time, a different number of turns of film on one roller than on the other. Since the film has a not insignificant thickness, and since the two rollers have the same diameter and rotate in synchronism with each other, the respective overall diameters of the rollers including the turns of film wound on them (this overall diameter also being referred to in this application as the "roll diameter"), vary continuously. This gives rise to consequent tensions which are exerted on the film and which can lead to rupture of the film.

DISCUSSION OF THE INVENTION

An object of the invention is to overcome the above mentioned drawback.

According to the invention, a flow control device for controlling the flow of a stream of air through an air passage aperture, in particular for a heating and/or air conditioning installation in a motor vehicle, the flow control device being of the type comprising a film which is wound on two rollers spaced apart from each other, with an active portion of the film extending between the two rollers and disposed transversely to the said air passage aperture, the said active portion of the film defining open and closed regions for the selective control of the stream of air according to the relative amounts by which the film is wound on the respective rollers, with drive means being provided for driving the two rollers synchronously in rotation, is characterised in that it includes a case or housing, defining within the case two reserve spaces, each of which surrounds a respective one of the two rollers, whereby each said reserve space can serve as a magazine for an excess of film forming a slack loop and resulting from differences between the roll diameters of the two rollers, i.e. the overall diameter of each roller measured over the film wound thereon.

The invention thus enables magazines to be provided for absorbing the excess film that forms beside one or other of the two rollers during operation of the device.

According to a preferred feature of the invention, the drive means are adapted to displace the film between two extreme positions, in each of which the film is in tension, by passing through intermediate positions in which the film is de-tensioned, forming each time an excess of film which is absorbed in one or other of the two reserve spaces according to the direction of rotation of the rollers. Thus in a first extreme position, a first one of the rollers has a minimum roll diameter, while the second roller has a maximum roll diameter, the film being in tension. To the extent that the film is unwound from the second roller so as to become wound on to the first roller, the roll diameter, or overall diameter, of the first roller increases, while that of the second roller decreases.

Since the two rollers are driven in synchronism with each other, an excess of film is initially formed beside the second roller, the roll diameter of which is the greater. Subsequently, as the roll diameter of the first roller increases and then overtakes that of the second roller, the excess in film length between the rollers tends to decrease. When the film reaches the other extreme position, the roll diameter of the first roller is at a maximum, while that of the second roller is at a minimum, the film being again in tension. Later, when the film is displaced in the opposite direction, the operation of the two rollers is reversed, so that an excess of film is initially produced beside the first roller.

According to another preferred feature of the invention, each of the said reserve spaces includes a wall portion which is generally concentric with the corresponding roller.

According to a further preferred feature of the invention, the housing of the flow control device includes an engagement or guide frame which is disposed between the two rollers so as to guide the film and provide contact for the film, the device further including spring means arranged to hold the film flat against the guide frame. In this way, the film can always be sure to be held properly extended in the region corresponding to the guide frame, that is to say in the active region of the film where it extends across, and facing, the air passage aperture through which the air to be controlled passes.

According to yet another preferred feature of the invention, the spring means are carried by a press frame which is disposed in facing relationship with the guide frame.

The spring means preferably comprise leaf springs, each of which extends in the direction of displacement of the film, that is to say in a direction transverse to the axes of rotation of the rollers.

Although the flow control device of the invention may be integrated in an installation such as an installation for heating and/or air conditioning in a motor vehicle, in preferred embodiments the flow control device is in the form of an independent module. Such a module can then be fixed across the air passage aperture. In that case, the flow control device preferably includes a connecting skirt for enabling the module to be fitted to the air passage aperture.

Further features and advantages of the invention will appear more clearly on a reading of the following detailed description of a preferred embodiment of the invention, which is given by way of non-limiting example only and with reference to the accompanying drawings.

DESCRIPTION OF A PREFERRED EMBODIMENT OF THE INVENTION

Figure 1:
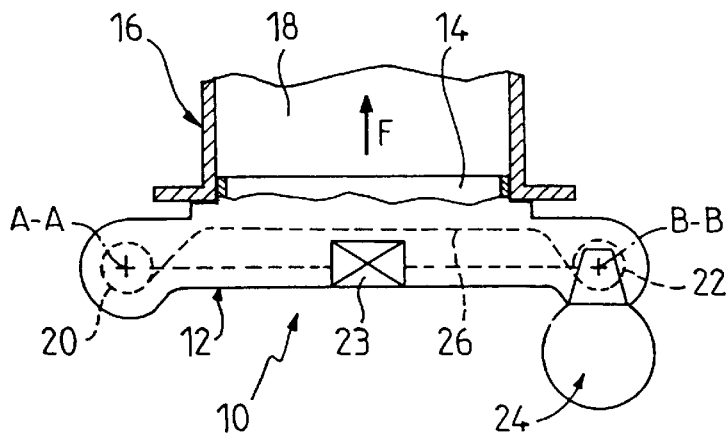
FIG. 1 is a view in partial cross section, showing an air passage aperture equipped with a flow control device in accordance with the invention.

Reference is first made to FIG. 1, which shows a flow control device 1 in the form of an independent module or cassette which comprises a case or housing 12, made preferably in a suitable plastics material. The case 12 is provided with a connecting skirt 14 which is designed to enable the cassette 10 to be fitted to an air passage 16. In this example the air passage 16 is a duct which forms part of a heating and/or air conditioning apparatus for a motor vehicle. The air passage 16 has an open end, or air passage aperture, 18 through which a stream of air F, which is controlled by the device 10, flows. The device 10 is thus fitted, by means of the skirt 14, in the flow passage aperture 18.

The flow control device 10 includes two rollers 20 and 22, which are spaced apart and which lie on either side of the air passage 16. The rollers 20 and 22 are mounted for rotation about parallel axes AA and BB respectively. The axes AA and BB of the rollers 20 and 22 are synchronised in rotation by a synchronising mechanism 23, which is indicated diagrammatically and which may for example comprise a synchronising spindle or a synchronising cable. A drive unit 24 is coupled to the roller 22. The drive unit 24 is a motorised gear unit, comprising an electric motor and suitable gearing coupling the electric motor to the roller 22 on the axis BB. The drive unit 24 thus drives the rollers 20 and 22 in rotation in either direction, this rotation being synchronised by the synchronising mechanism 23 which couples the two rollers together.

Figure 2A:
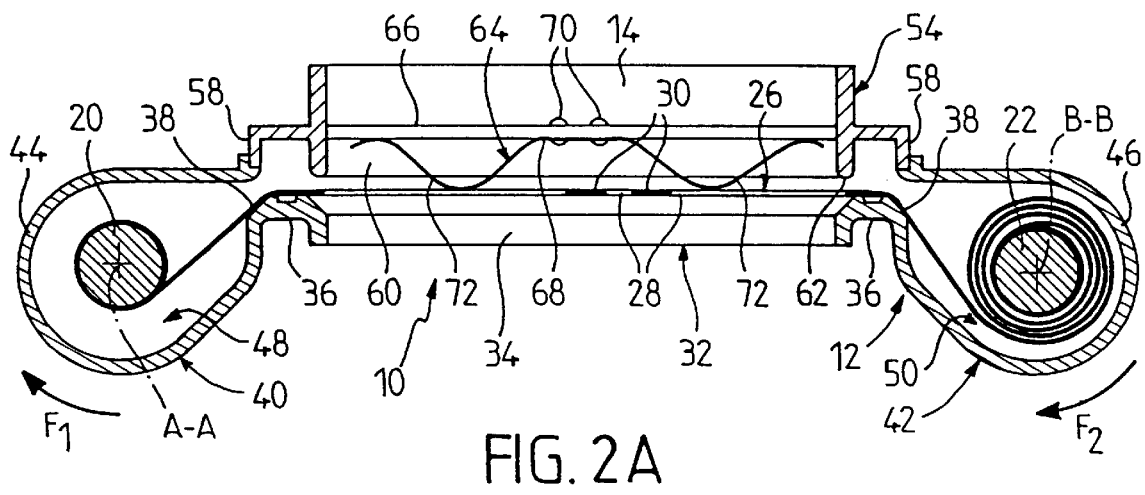
FIG. 2A is a view in longitudinal cross section of the device seen in FIG. 1, being shown in FIG. 2A in a first extreme position.

The flow control device 10 also includes a film 26 which is made in the form of a rectangular flexible strip constituting a blind or curtain. The film 26 has an active portion defining open regions 28 and closed regions 30, as can be seen in FIG. 2A. The film 26 may for example be made in a suitable plastics material or in a metallic material. Its thickness typically lies in the range of, for example, 0.2 to 0.5 millimeters, and its length typically lies in the range of, for example, 10 centimeters to 1 meter. The two ends of the film 26 are rolled on the two rollers 20 and 22 respectively.

Rotation of the rollers in either direction thus displaces the film 26 longitudinally so as to put the portion of the latter into different transverse positions with respect to the air passage aperture 18.

Having regard to the fact that the film 26 has open regions 28 and closed regions 30 which are located in selected positions on the film, the flow of air F can thus be selectively controlled according to the longitudinal position of the film 26 across the air passage aperture 18.

The cassette 12 includes in its central part a guide frame 32 which serves for contact and guidance of the film 26 in the region lying between the two rollers 20 and 22. The guide frame 22 has two longitudinal sides 34 which extend parallel to the direction of displacement of the film, together with two transverse sides 36. The two transverse sides 36 are also joined together through a longitudinal spacer portion (not shown) which extends parallel to the two longitudinal sides 34, halfway between these latter. In addition, each of the two transverse sides 36 is formed with an entry chamfer 38 (see FIG. 2A) which facilitates the displacement of the film 26 in either direction.

On each side, the guide frame 32 is extended by two envelope walls 40 and 42 of the cassette 12. Each envelope wall 40 or 42 includes respective wall portions 44 and 46 which are concentric with the axes AA and BB respectively. The envelope walls 40 and 42 thus define two internal spaces 48 and 50, also referred to herein as "reserve spaces", the function of which will be explained later in this description.

The cassette 12 also includes a press frame 54 having a body which includes the previously mentioned skirt 14 of FIG. 1. The skirt 14 has two opposed edge portions 58 which are fixed to the walls 40 and 42 as shown. On the opposite side of the press frame 54 from the connecting skirt 14, the press frame body is formed with a window 60, the contour of which matches that of the guide frame 32. The window 60 has a rounded peripheral edge 62 so as not to damage the film 26.

The press frame 54 also includes leaf springs 64, of which there are three in this example. The springs 64 are disposed parallel to each other and extend in a direction parallel to the direction of displacement of the film 26, that is to say they extend at right angles to the axes AA and BB of the rollers. Each of the leaf springs 64 is fixed to a longitudinal element 66 of the press frame body. Each leaf spring 64 has a central portion 68, which is fixed to the body of the press frame 54 by means of rivets 70, together with two corrugations 72 lying on either side of the central portion 68. The leaf springs 64 thus serve to press the film 26 against the guide frame 32, that is to say more particularly against the two longitudinal sides 34 of the guide frame and against the longitudinal spacer. As a result, the film 26 is always held flat in the region of the guide frame 32 and press frame 54, that is to say in the active region of the film through which the air stream F passes.

The operation of the flow control device described above will now be described with reference to FIGS. 2A to 2E. In the position shown in FIG. 2A, which is one of the two extreme end positions of the film, the film 26 is rolled on the roller 20, which has a minimum roll diameter (the term "roll diameter" being as defined earlier herein), and around the roller 22 which has a maximum roll diameter. The film 26 is in tension, in particular in the regions lying between each of the chamfers 38 and the corresponding roller.

Figure 2B:
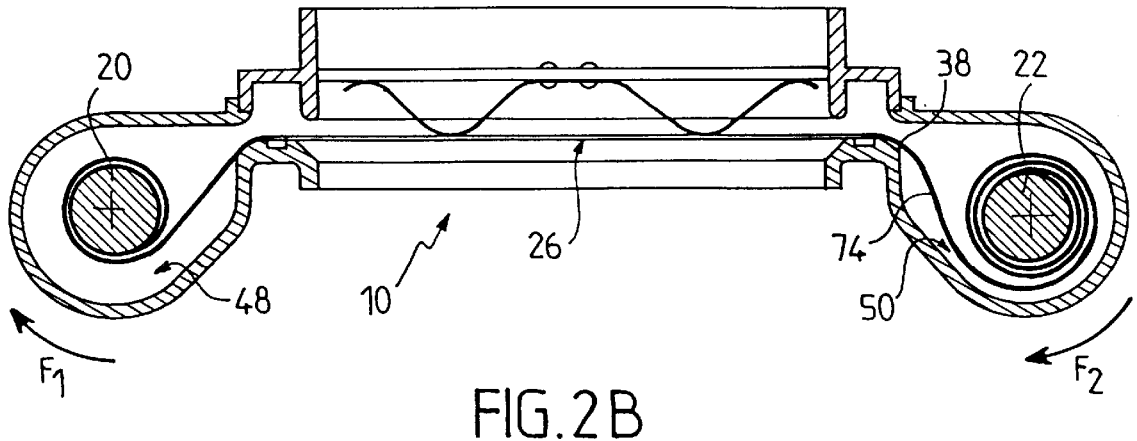
FIGS. 2B to 2D are views in cross section, similar to that in FIG. 2A but showing the device in three respective intermediate positions.

If the two rollers 20 and 22 are now rotated in the clockwise direction with reference to the Figures, as indicated by the arrows F1 and F2, the film is displaced until it reaches a first intermediate position as shown in FIG. 2B.

Due to the fact that the rollers are driven synchronously and that they have different roll diameters, an excess of film is created as indicated at 74 in FIG. 2B, which forms a slack loop, see FIG. 2B. This slack loop is accommodated within the reserve space 50, which therefore serves as a magazine. As a result, the portion of the film 26 extending between the roller 22 and the adjacent chamfer 38 is relaxed.

Figure 2C:
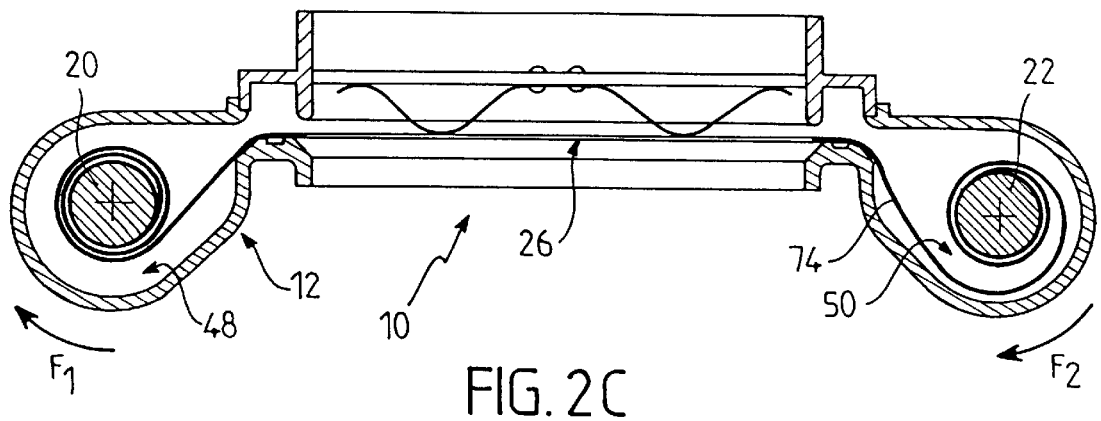
Figure 2D:
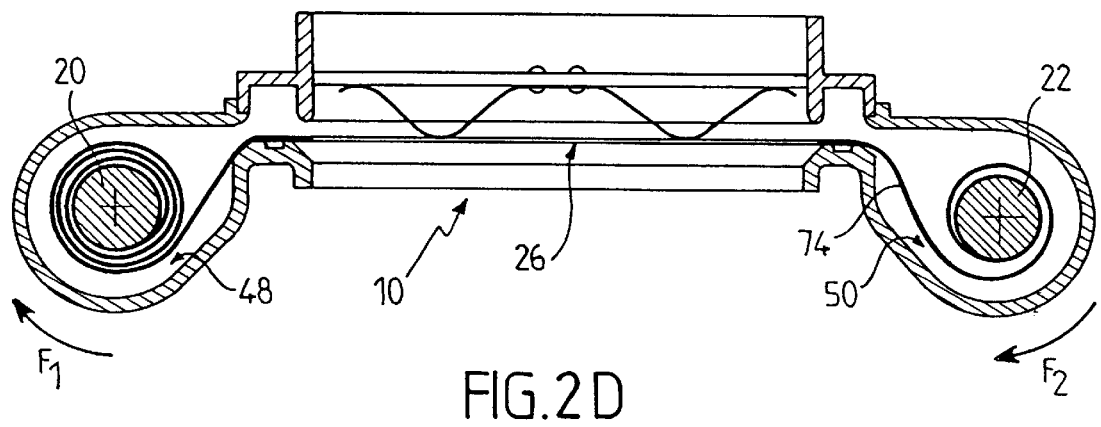
Figure 2E:
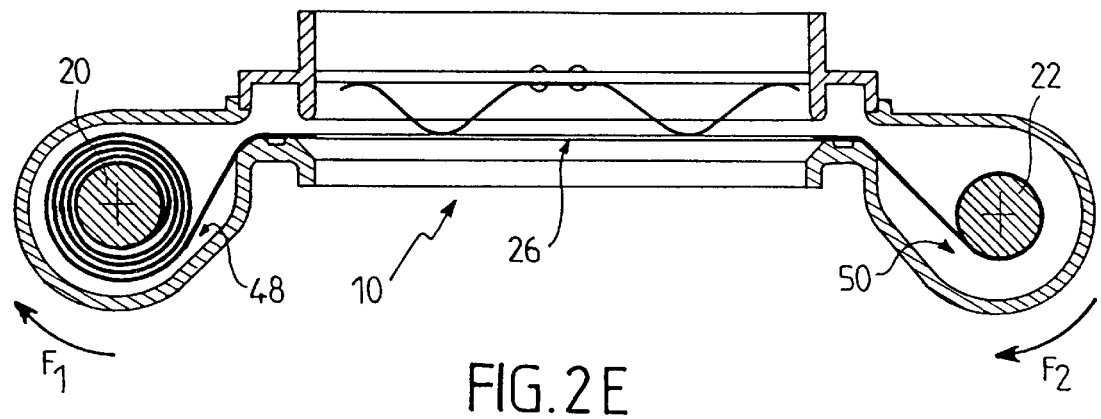
FIG. 2E is a view in cross section, similar to FIGS. 2A to 2D but showing the same device in a second extreme position.

As the rotation of the two rollers is continued, still in the same direction of rotation, it will reach the intermediate position shown in FIG. 2C, in which the roll diameters of the two rollers are substantially equal. As a result, the excess of film 74 has now increased to an amount larger than that in the first intermediate position shown in FIG. 2B. This excess, or slack, is still received in the reserve space 50. Still further displacement of the film by rotation of the rollers in the same direction, brings the film to the third intermediate position represented in FIG. 2D. In this position, the roll diameter of the roller 20 has become greater than that of the roller 22. As a result, the slack 74 in the film has now been partly reabsorbed. Further continued rotation of the rollers in the same direction brings the film into the other extreme position shown in FIG. 2E, in which the roll diameter of the roller 20 is at a maximum, and the roll diameter of the roller 22 is at a minimum. The film is now fully in tension in the two portions lying respectively between the two rollers 20 and 22 and the guide frame 32.

If the film is subsequently displaced in the opposite direction by rotation of the two rollers in the anticlockwise direction with respect to the drawings, the opposite effect is of course produced, that is to say slack is initially created in the film beside the roller 20 in the reserve space 48. This slack will increase progressively up to the middle intermediate position (FIG. 2C), after which it will diminish progressively as the extreme position of FIG. 2A is approached. The result of this is that the film 26 is in no danger of being torn, because an excess, or slack portion, of film is created, which is absorbed on each occasion in one of the two reserve spaces, according to the direction of rotation of the rollers. In addition, the film 26 is held completely flat as explained above.

The example shown in the drawings and described above describes the film in five different positions which correspond to different respective configurations for control of the air stream.

The invention is of course not limited to the above embodiment, and it does embrace other versions. Thus, for example, the flow control device could be integrated into the heating or air conditioning installation itself, instead of being made in the form of a separate module. It should also be noted that the particular form of the case or housing of the flow control device, and in particular that of the two reserve spaces associated with the two respective rollers, can be varied according to the requirements of each particular case.

The invention is applicable in general, but without limitation, to vehicles adapted for touring purposes, with or without the air conditioning option.

What is claimed is:

1. An air flow control device for controlling the flow of a stream of air through an aperture, the device comprising:
   a pair of rollers,
   means mounting said rollers spaced apart from each other,
   drive means coupled to the rollers for driving the rollers synchronously,
   a film having two ends each wound on a respective one of said rollers, to define between the rollers an active portion of the film to extend across said aperture, said active portion defining open regions and closed regions, and
   a hollow case carrying said rollers within the case and carrying the drive means, the case defining two reserve spaces, each reserve space at least partly surrounding a respective one of the two rollers so as to serve as a magazine for receiving a slack loop of the film resulting from the overall diameter of one said roller including said film wound thereon being different from that of the other said roller,
   wherein the drive means are adapted to displace the film between two extreme positions, in each of which the film is in tension, and intermediate positions between the two said extreme positions, in which intermediate positions the film is at least partly de-tensioned, thereby defining said slack loop.

2. The air flow control device of claim 1, wherein the case includes two wall portions each of which is generally concentric with a corresponding one of said rollers, each said wall portion defining a said reserve space within it.

3. The air flow control device of claim 2, wherein the case includes a guide frame disposed between the two rollers for guiding the film and for contact with the film, the device further including a spring for holding the film against the guide frame.

4. The air flow control device of claim 3, wherein the spring comprises a plurality of leaf springs, each extending in the direction of displacement of the film between said rollers.

5. The air flow control device of claim 2, constituting an independent module and including means for fixing said module across an air passage aperture.

6. The air flow control device of claim 1, wherein the case includes a guide frame disposed between the two rollers for guiding the film and for contact with the film, the device further including a spring for holding the film against the guide frame.

7. The air flow control device of claim 6, wherein the spring comprises a plurality of leaf springs, each extending in the direction of displacement of the film between said rollers.

8. The air flow control device of claim 1, constituting an independent module and including means for fixing said module across an air passage aperture.

9. An air flow control device for controlling the flow of a stream of air through an aperture, the device comprising:
   a pair of rollers,
   means mounting said rollers spaced apart from each other,
   drive means coupled to the rollers for driving the rollers synchronously,
   a film having two ends each wound on a respective one of said rollers, to define between the rollers an active portion of the film to extend across said aperture, said active portion defining open regions and closed regions, and
   a hollow case carrying said rollers within the case and carrying the drive means, the case defining two reserve spaces, each reserve space at least partly surrounding a respective one of the two rollers so as to serve as a magazine for receiving a slack loop of the film resulting from the overall diameter of one said roller including said film wound thereon being different from that of the other said roller,
   wherein the case includes two wall portions each of which is generally concentric with a corresponding one of said rollers, each said wall portion defining a said reserve space within it.

10. The air flow control device of claim 9, wherein the case includes a guide frame disposed between the two rollers for guiding the film and for contact with the film, the device further including a spring for holding the film against the guide frame.

11. The air flow control device of claim 10, wherein the spring comprises a plurality of leaf springs, each extending in the direction of displacement of the film between said rollers.

12. The air flow control device of claim 9, constituting an independent module and including means for fixing said module across an air passage aperture.

13. An air flow control device for controlling the flow of a stream of air through an aperture, the device comprising:
   a pair of rollers,
   means mounting said rollers spaced apart from each other,
   drive means coupled to the rollers for driving the rollers synchronously,
   a film having two ends each wound on a respective one of said rollers, to define between the rollers an active portion of the film to extend across said aperture, said active portion defining open regions and closed regions, and
   a hollow case carrying said rollers within the case and carrying the drive means, the case defining two reserve spaces, each reserve space at least partly surrounding a respective one of the two rollers so as to serve as a magazine for receiving a slack loop of the film resulting from the overall diameter of one said roller including said film wound thereon being different from that of the other said roller,
   wherein the case includes a guide frame disposed between the two rollers for guiding the film and for contact with the film, the device further including a spring for holding the film against the guide frame.

14. The air flow control device according to claim 13, further including a press frame carried by the case in facing relationship with the guide frame, said press frame carrying said spring.

15. The air flow control device according claim 13, wherein the spring comprises a plurality of leaf springs, each extending in the direction of displacement of the film between said rollers.

16. The air flow control device of claim 13, constituting an independent module and including means for fixing said module across an air passage aperture.

17. An air flow control device for controlling the flow of a stream of air through an aperture, the device comprising:
   a pair of rollers,
   means mounting said rollers spaced apart from each other,
   drive means coupled to the rollers for driving the rollers synchronously,
   a film having two ends each wound on a respective one of said rollers, to define between the rollers an active portion of the film to extend across said aperture, said active portion defining open regions and closed regions, and
   a hollow case carrying said rollers within the case and carrying the drive means, the case defining two reserve spaces, each reserve space at least partly surrounding a respective one of the two rollers so as to serve as a magazine for receiving a slack loop of the film resulting from the overall diameter of one said roller including said film wound thereon being different from that of the other said roller,
   constituting an independent module and including means for fixing said module across an air passage aperture.

18. A flow control device according to claim 17, wherein said fixing means comprise a connecting skirt for fitting the module in a said aperture.

\* \* \* \* \*